US010118756B2

(12) United States Patent
Clamagirand et al.

(10) Patent No.: US 10,118,756 B2
(45) Date of Patent: Nov. 6, 2018

(54) PACKAGING DEVICE FOR A WINDSCREEN WIPER COMPRISING A CURVED BLADE AND AN INTEGRATED FLEXIBLE STRUCTURE

(71) Applicant: Valeo North America, Inc., Troy, MI (US)

(72) Inventors: Catherine Clamagirand, Issoire (FR); Stéphane Houssat, Issoire (FR)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 15/977,672

(22) Filed: May 11, 2018

(65) Prior Publication Data

US 2018/0257852 A1   Sep. 13, 2018

Related U.S. Application Data

(63) Continuation of application No. 15/180,331, filed on Jun. 13, 2016, which is a continuation of application
(Continued)

(30) Foreign Application Priority Data

Sep. 15, 2003   (FR) ...................................... 03 10817

(51) Int. Cl.
| B65D 73/00 | (2006.01) |
| B65D 85/68 | (2006.01) |
| B65D 75/56 | (2006.01) |
| B65D 85/00 | (2006.01) |
| B65D 75/32 | (2006.01) |

(Continued)

(52) U.S. Cl.
CPC ............ *B65D 85/68* (2013.01); *B60S 1/3808* (2013.01); *B60S 1/3848* (2013.01); *B65D 25/10* (2013.01); *B65D 75/32* (2013.01); *B65D 75/56* (2013.01); *B65D 85/00* (2013.01); *B60S 2001/3843* (2013.01); *B65D 2585/6885* (2013.01)

(58) Field of Classification Search
CPC ........ B65D 85/68; B65D 75/56; B65D 85/00; B65D 75/32; B65D 25/10; B65D 2585/6885; B60S 1/3848; B60S 1/3808
USPC ................ 206/461–471, 443, 335, 775, 314; 15/250.001
See application file for complete search history.

(56) References Cited

U.S. PATENT DOCUMENTS

| 4,854,450 A * | 8/1989 | Fisher ................... B65D 75/368 206/459.5 |
| 6,779,661 B1 * | 8/2004 | Kotlarski .............. B60S 1/3879 206/335 |
| 2003/0062284 A1 * | 4/2003 | Charng ................ B65D 43/162 206/470 |

* cited by examiner

*Primary Examiner* — Rafael Ortiz
(74) *Attorney, Agent, or Firm* — Osha Liang LLP

(57) ABSTRACT

A packaging device for a windscreen wiper blade has a housing configured to receive the blade, having a first support surface configured to contact a portion of an upper part of the blade, a second support surface configured to contact a first portion of a lower part of the blade, a third support surface configured to contact a second portion of the lower part of the blade, a centering means, and a hooking means for hanging the packaging device vertically. The centering means blocks the blade at the center of the housing when the packaging device is hung. The first support surface extends opposite an area situated between the second support surface and the third support surface, and the first, second, and third support surfaces together immobilize the
(Continued)

blade inside the housing in a position that is at least partially straightened out relative to a resting position of the blade.

18 Claims, 4 Drawing Sheets

Related U.S. Application Data

No. 10/572,003, filed as application No. PCT/EP2004/010313 on Sep. 15, 2014, now Pat. No. 9,365,317.

(51) Int. Cl.
*B65D 25/10* (2006.01)
*B60S 1/38* (2006.01)

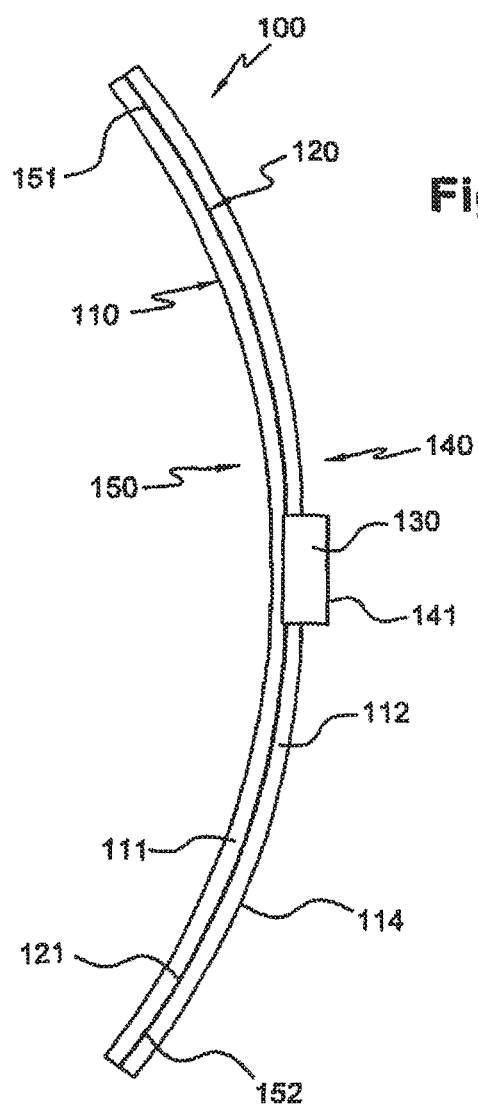
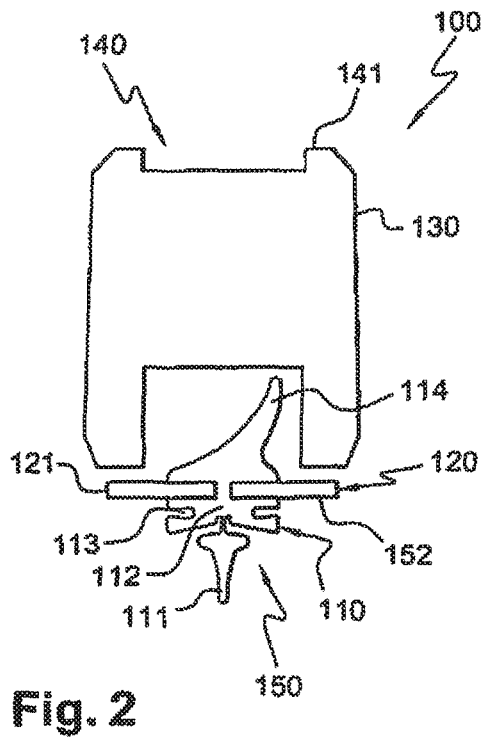

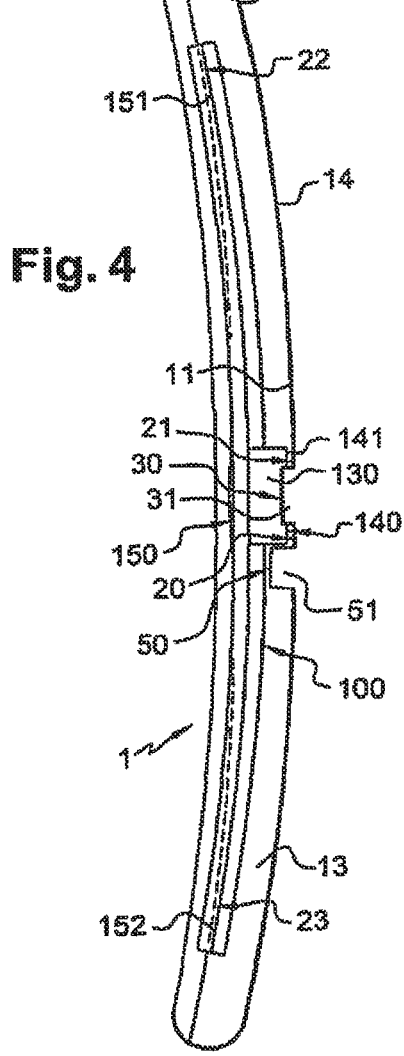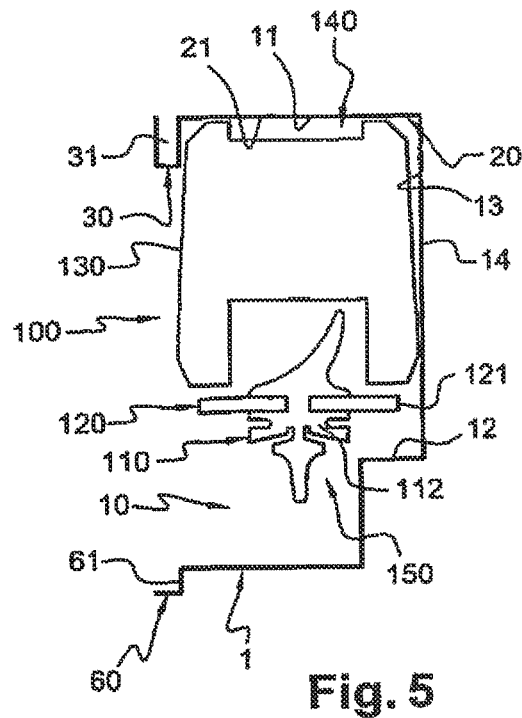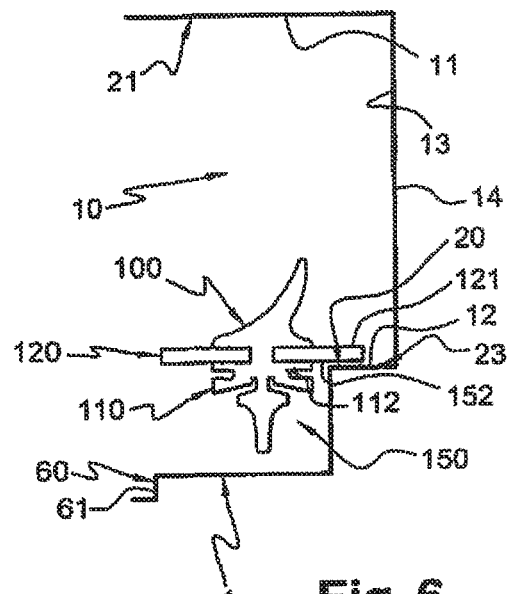

PACKAGING DEVICE FOR A WINDSCREEN WIPER COMPRISING A CURVED BLADE AND AN INTEGRATED FLEXIBLE STRUCTURE

BACKGROUND

Field of the Disclosure

The invention relates to a packaging device indented for packaging a windscreen wiper blade comprising a curved blade with integrated flexible structure.

The invention has a particularly advantageous, although not exclusive, application in the field of spare parts for motor vehicles.

Background Art

Today, there is a new generation of windscreen wiper blades that have the particularity of not being equipped with compensator structures, as opposed to the straight windscreen wiper blades that are commonly used nowadays. This new type of windscreen wiper still has a flexible wiping blade, but the outer framework that is responsible for supporting it is replaced by a flexible structure that is integrated directly in the blade. The assembly is arranged such that in its resting position, the blade has a concave longitudinal shape in its sagittal plane, and yet, when in contact with a surface to be wiped, said blade is able to straighten up by elastic distortion of its flexible structure so as to match said surface as best as possible throughout its entire movement.

Due precisely to its curved shape, a windscreen wiper with a curved blade is much larger in its resting position than a similar windscreen wiper with compensators and a straight blade. It therefore turns out to be a lot more problematic to package it, since it is not conceivable to use a simple blister pack with a matching shape. The volume of the packaging must, in fact, be relatively reduced mainly for reasons of manufacturing costs, protection of the environment and logistics among others.

In order to solve this difficulty, there are known ways of using a packaging provided with holding means that can be used to immobilize the blade inside a housing, in a position that is at least partially straightened out in relation to its resting position.

International patent application WO 01/30619 describes mainly a packaging device that is presented in the form of a shell in which two rectilinear grooves are made facing each other. The assembly is arranged so that each groove is able to fit together with a projecting part that extends along the entire matching face of the blade, and mainly with one of the elastically deformable tongues that make up the flexible structure.

This document also describes a substantially equivalent variant. In fact, contrary to the embodiment of the invention mentioned previously, the shell in this case is provided with two inner flanges that are both rigid and linear. Arranged opposite each other, they can fit into a series of grooves that extend longitudinally on either side of the heel of the blade, and mainly in the existing grooves, which are designed so as to provide the blade with the flexibility required for its reversal.

This type of packaging device, however, has the disadvantage of being particularly impractical to use. The placing of the blade inside the housing turns out, in fact, to be very complicated in the practice, since it requires said blade to be precisely straightened out in order to be able to perform the double fitting with the shell, which furthermore covers the entire length of all the sides of said blade. Moreover, such a packaging device does not allow the blade to be promoted sufficiently, insofar as all its sides are partially concealed by the holding means once said blade is in place.

SUMMARY OF THE INVENTION

Also, the technical problem to be solved by this invention is to provide a packaging device for a windscreen wiper with a curved blade and an integrated flexible structure, said packaging device comprising a housing that is designed to receive the blade, as well as holding means that are used to immobilize said blade inside said housing in a position that can be at least partially straightened out in relation to its resting position, a packaging device that would make it possible to avoid the problems of the state of the art mainly by providing considerably improved user-friendliness, while improving its capacity for promoting the product.

The solution to the posed technical problem consists, according to this invention, in that the holding means comprise a first support surface that can cooperate by contact with a portion of the upper part of the blade, a second support surface that can cooperate by contact with a first portion of the lower part of said blade, and a third support surface that can cooperate by contact with a second portion of said lower part of the blade, the first support surface extending opposite an area situated between the second support surface and the third support surface.

The invention as described has the advantage of being extremely easy to use. The fact that the holding means of the packaging device are designed so as to cooperate with parts of the blade that are truly external and opposite in the sagittal plane implies that the relevant support surfaces are positioned substantially opposite each other and at a distance, which therefore makes them particularly accessible.

To be put in place, the blade simply needs to be straightened out in its sagittal plane without it being necessary to give it a particular curve, unlike in the previous technique. Once positioned between the holding means, the blade is released until its upper and lower parts come into contact with the relevant support surfaces. The elastic restoring force created by placing the flexible structure under stress between the various support surfaces thus assures the immobilization of the windscreen wiper inside the housing.

In addition, the fact that the holding takes place respectively at the level of the upper and lower ends of the blade makes it possible to free up the space situated on the sides of said blade. With the obvious condition that the corresponding wall of the packaging is transparent or translucent, it is therefore possible to show at least one of the sides of the blade almost entirely. This makes it possible to promote the shape and/or the particular structure of the blade. This aesthetic characteristic constitutes a decisive advantage from a marketing point of view.

It should be noted that the real contact surface between each support surface and the corresponding portion of the blade is not necessarily continuous, but rather that it can consist of several contact points of variable sizes and more or less regularly spaced.

This invention also relates to the characteristics that will appear throughout the following description, and which must be considered separately or according to all their possible technical combinations.

This description, provided as a non-exhaustive example, will facilitate understanding of how the invention can be manufactured, in relation to the appended drawings, in which:

BRIEF DESCRIPTION OF DRAWINGS

FIG. 1 is a schematic illustration of a windscreen wiper that can be packaged in a packaging device according to the invention.

FIG. 2 is a cross-section view of the windscreen wiper in FIG. 1.

FIG. 4 shows the position of the windscreen wiper in FIGS. 1 and 2 inside the housing of the packaging device in FIG. 3.

FIG. 5 is a cross-section view of the assembly in FIG. 4, made at the level of the centre of the windscreen wiper.

FIG. 6 also shows a cross-section view of the assembly in FIG. 4, but made in this case at the level of one of the contact areas of the windscreen wiper.

DETAILED DESCRIPTION

Figure 3:
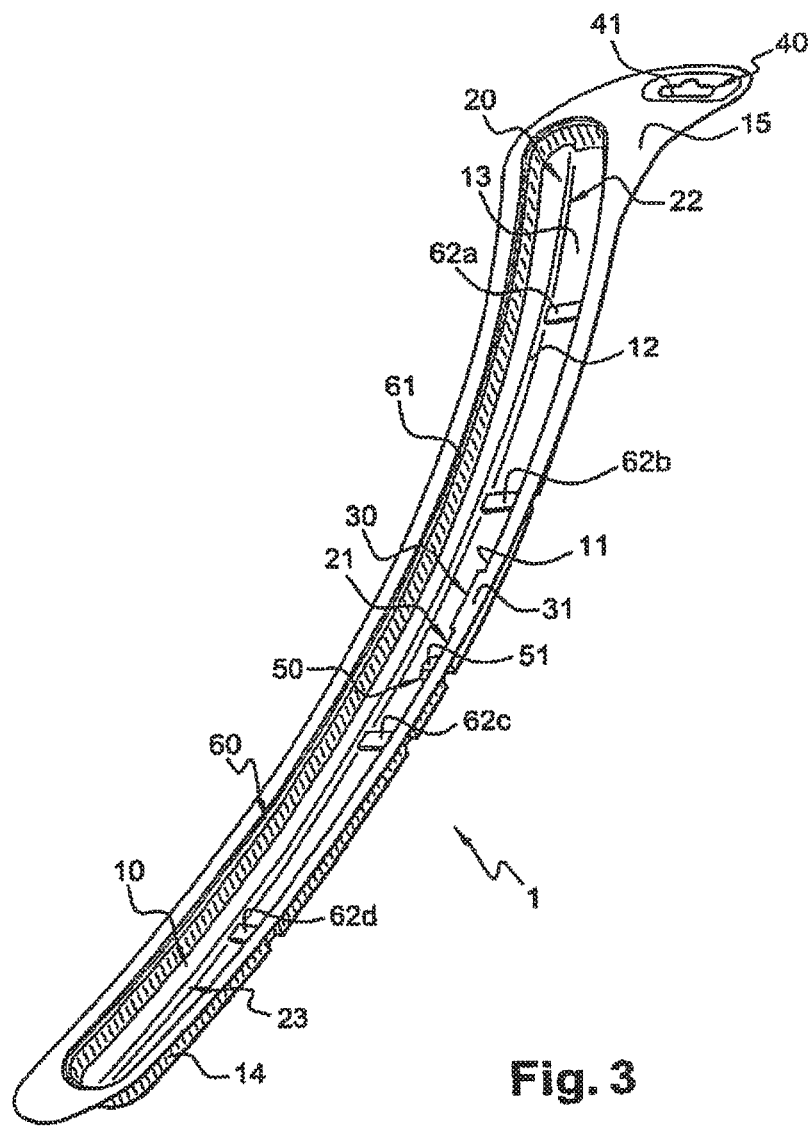
FIG. 3 shows a packaging device according to the invention.

For reasons of clarity, the same elements are designated using identical references. Likewise, only the elements that are essential for understanding the invention are represented, and this without respecting the scale and in a schematic fashion.

FIG. 1 shows in a schematic fashion a windscreen blade 100 with a curved blade 110 and an integrated flexible structure 120, which is more particularly designed for equipping a motor vehicle. It should be noted that in this field, such a wiping element is often called a flat blade due to its small height, a characteristic that results precisely from the lack of a compensator framework. In this representation in resting position, the curved shape of the blade 110 which is imposed by the curved profile of the flexible structure 120 is remarkable, whatever it is.

Thus, as can be seen more clearly in FIG. 2, the blade 110 of the windscreen wiper 100 normally consists of a lip 111 that is designed to cooperate directly by sliding contact with a surface to be wiped, as well as of a heel 112 that forms an interface between said lip 111 and the flexible structure 120. Due to their respective functions, the lip 111 is particularly hard and resistant to wear, while the heel 112 provides the flexibility required for the optimum return of the blade 110 during inversions of the wiping direction. It should be noted that in this case this flexibility results, above all, from the particular cut of the heel 112 of the blade 110, and mainly from the presence of longitudinal grooves 113.

The presence of a spoiler 114 is also remarkable, which is also normally an integral part of the upper part of the heel 112. In fact, the blade 110 consists of an elastomer profile that groups together, in an assembly made from a single part, both the lip 111, the heel 112 and the spoiler 114.

As for the flexible structure 120, it consists, in this example of an embodiment of the invention, of two elastically deformable tongues 121, which are longitudinally integrated, respectively at the level of either side of the blade 110. Each tongue 121, commonly called a vertebra, is used to distribute the support pressure evenly over the entire length of the blade 110 with the aim of optimizing the wiping quality. They are made from metal in this embodiment of the invention.

Another distinguishing feature is the presence of a linking element 130, which in this case is still normally designed to allow the blade 100 to be mounted on a driving mechanism. In order to fulfil its function, the linking element 130 is solidly attached to the upper part 140 of the blade 100 and it has a structure that can cooperate by assembly with complementary linking means, arranged at the end of the operating arm of the associated driving mechanism.

FIG. 3 shows a packaging device 1 designed to be used as the packaging of a windscreen wiper 100 as described above. In this particular embodiment of the invention, selected only as an example, the packaging device 1 is thus provided with a housing 10 designed to receive the blade 100, as well as holding means 20 that are used to immobilize said blade 100 inside said housing 10 in a position that is partially straightened out in relation to its resting position.

In accordance with the objective of this invention, the holding means 20 comprise, initially, a support surface 21 that can cooperate by contact with a portion 141 of the upper part 140 of the blade 100. The holding means 20 are also provided with a second support surface 22 which can also cooperate by contact with a first portion 151 of the lower part 150 of the blade 100. The holding means 20 are finally provided with a third support surface 23 that can cooperate by contact with a second portion 152 of the lower part 150 of the blade 100. The assembly is arranged such that the first support surface 21 extends opposite an area situated between the second support surface 22 and the third support surface 23. The three support surfaces 21, 22, 23 are thus positioned in a triangle at a distance from each other, which makes it possible to effectively provide three-point holding.

In a particularly advantageous fashion, the three support surfaces 21, 22, 23 are arranged such that the first support surface 21 can cooperate by contact with a substantially central portion 141 of the upper part 140 of the blade 100, and such that the second support surface 22 and the third support surface 23 are respectively able to cooperate with generally extremal portions 151, 152 of the lower part 150 of said blade 100.

According to another advantageous characteristic of the invention, the first support surface 21 is arranged substantially at equal distances from the second support surface 22 and from the third support surface 23. This specific feature enables an even distribution of the pressure forces that are generated by the elastic distortion of the flexible structure 120 and which result in the blade 100 being held inside the housing 10.

According to a particularity of the invention that can be seen in FIG. 4, the first support surface 21 consists of a portion of a wall 11 that delimits the sides of the housing 10.

In this example of an embodiment of the invention, the blade 100 comprises a linking element 130 positioned on its upper part 140, so that it is advantageous for the first support surface 21 to be able to cooperate by contact with the relevant linking element 130.

According to another particularity of the invention, the second support surface 22 and the third support surface 23 consist of portions of the same flange 12 made longitudinally in the bottom of the housing 10.

Preferably, the second support surface 22 and the third support surface 23 are arranged such as to be able to cooperate by contact with the heel 112 of the blade 110. The aim is to prevent any contact between the packaging device 1 and the lip 111, in order to preserve the integrity of the latter.

If it is important for the relevant contacts to be made at the level of parts of the blade 110 that are adjacent to the lip 111, it is even more particularly advantageous for the second support surface 22 and the third support surface 23 to be able to cooperate by contact with the flexible structure 120 which is integrated in the heel 112 of the blade 110 (FIG. 6). In fact, each metal tongue 121 in this example of an embodiment of the invention has a hardness that is considerably higher than that of the elastomer that makes up the blade 110, such that it constitutes a considerably more stable contact surface, resulting in improved holding. This characteristic also allows the integrity of the flexible blade, which is, by nature, a lot more fragile than the flexible structure 120, to be preserved.

According to another particularity of the invention, the packaging device 1 is provided with restraining means 30 that can block at least a part of the blade 100 inside the housing 10, along a direction that is substantially perpendicular to the sagittal plane of said blade 100.

In a particularly advantageous fashion, the restraining means 30 are able to pin at least a part of the blade 100 against the bottom 13 of the housing 10. This characteristic makes it possible to restrict the lateral play of the blade 100 when it is inside the housing 10.

FIGS. 5 and 6 show in detail the holding of the blade 100 inside the housing 10 at the level of the various contact points.

FIG. 5 deals more particularly with the relative positioning within the central part. It shows mainly the block made between the side wall 11 that delimits the housing 10 and the upper part 140 of the blade 100, materialized by the linking element 130. As for the lower part 150 of the blade 100, it is not subjected to any constraints in this specific place.

Also remarkable is the action of the restraining means 30, which participate in keeping the blade 100 flat against the bottom 13 of the housing 10. In this specific embodiment of the invention, the restraining means 30 comprise a stop 31 that is arranged directly below the housing 10 and which can also cooperate by contact with a portion of the lateral side of the blade 100, in this case, the linking element 130. It should be noted that if the stop 31 must be placed at the level of the opening of the housing 10 in order to fulfil its function, its positioning in terms of height from the bottom 13 only depends on the thickness of the upper part 140 of the blade 100, regardless of the depth of said housing 10.

Figure 7:
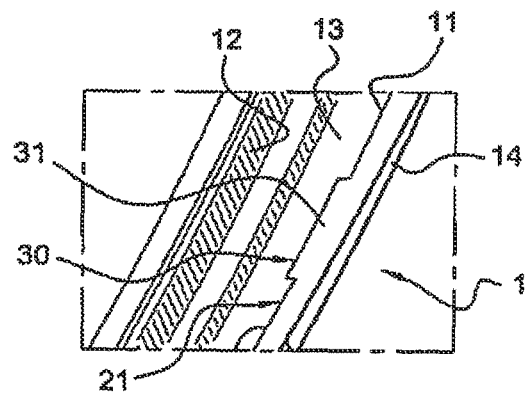
FIG. 7 shows a first portion of the central part of the packaging device in FIG. 3, a portion in which the restraining means are visible.

In the enlarged diagram shown in FIG. 7, it can be seen clearly that, in this example of an embodiment of the invention, the stop 31 is presented more specifically in the shape of a longitudinal flange, forming a return, which extends parallel to the bottom 13 of the housing 10.

As for FIG. 6, it shows the positioning of either end of the blade 100 in the housing 10. It should be noted that in this area only the lower part 150 of the blade 100 is in contact with the packaging device 1. In this case, as has already been explained previously, it is one of the tongues 121 of the flexible structure 120 which cooperates by contact with the flange 12 made longitudinally in the bottom of the housing.

As can be seen in FIG. 3, the packaging device 1 is also provided with hooking means 40 that can allow it to be hung in a position that matches a substantially vertical position of the blade 100. In this example of an embodiment of the invention, the hooking means 40 consist of a standard through hole 41 which is shaped such as to be able to cooperate with a harness hook of any display stand whatsoever.

According to another particularity of the invention, which can be seen in FIGS. 3 and 4, the packaging device 1 is also provided with centering means 50 which can longitudinally block the blade 100 inside the housing 10, at least in a given direction and substantially at the centre of said housing 10.

In the event of the longitudinal blocking not being complete, in other words of it only being effective in one direction, it is particularly advantageous for the centering means 50 to be able to block the blade 100 at the centre of the housing 10 when the packaging device 1 is hung in a substantially vertical fashion, by means of its hooking means 40.

When the blade 100 comprises a linking element 130 on its upper part 140 as in our specific embodiment of the invention, it is also particularly advantageous for the centering means 50 to consist of a stop 51 that can cooperate by contact with said linking element 130.

Figure 8:
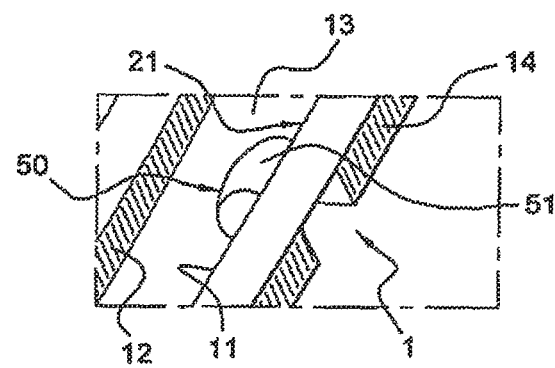
FIG. 8 shows a second portion of the central part of the packaging device in FIG. 3, a portion in which the centering means are visible.

In the enlargement of FIG. 8, it can be seen clearly that in this embodiment of the invention the stop 51 is presented, more specifically, in the form of a block placed transversally in the housing 10. In other terms, the relevant block extends perpendicular in relation to the lateral wall 11 and to the bottom 13.

It should be noted that this type of configuration turns out to be extremely interesting from an industrial point of view, since it facilitates the work of the operator who is responsible for the packaging. In fact, it is not necessary for the blade 100 to be inserted in the housing 10 in a unidirectional fashion, but rather it can be inserted indifferently from several very different approach angles. In more simple terms, the operator only has to take one centering stop into account instead of two, which considerably simplifies the filling task.

The usefulness of the centering means 50 is in systematically positioning the blade 100 in the centre of the housing 10, regardless of the length and thus the weight of said blade 100. It is therefore possible to package different sizes of blades 100 in the same type of packaging device 1, without needing to modify the position of the centre of gravity of the assembly. This characteristic makes it possible advantageously to obtain regular alignments when hanging several different packaging devices 1, even if the blades they contain are of different sizes. The promotion of the product is therefore improved to a considerable extent.

In accordance with another characteristic of the invention, the housing 10 is delimited in this case by a substantially rigid shell 14. This is a kind of thin envelope which, however, offers mechanical resistance that is compatible with its protective packaging function.

In a particularly advantageous fashion, the shell 14 is transparent or translucent. This characteristic makes it possible for the blade 100 to remain visible when it is packaged in the packaging device 1 according to the invention. In fact, it seems to be essential to promote the distinctive aesthetic features of this type of windscreen wiper 100 with a curved blade 110 and an integrated flexible structure 120, mainly as compared to the straight blades that are commonly used.

In this example of an embodiment of the invention, the shell 14 is therefore made from a plastic material, in this case an amorphous transparent PET, with a thickness of around 500 µm.

From a marketing point of view, it is also preferable to present the blade 100 in a position that is only partially straightened, in order to expose the curve of its blade 110 since, in addition to its intrinsic aesthetic features, the shape of the blade 100 is an essential distinctive characteristic for telling it apart from standard straight blades.

According to another particularity of the invention, the packaging device 1 comprises reinforcement means 60 that can increase the rigidity of the shell 14. The aim is to prevent the shell 14 from twisting when subjected to the forces of pressure caused by the elastic distortion of the flexible structure 120 of the blade 100.

Figure 9:
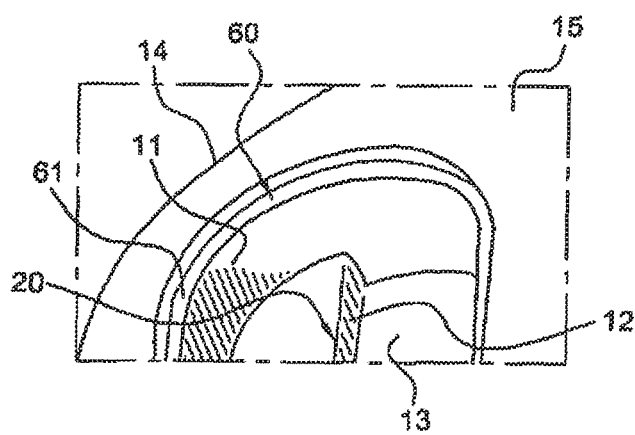
FIG. 9 shows an end of the housing made in the centre of the packaging device in FIG. 3.

In this specific embodiment of the invention, the reinforcement means 60 are initially provided with a shoulder 61 that is made in the periphery of the opening of the housing 10 and which extends in a substantially perpendicular fashion to the side wall 11 of the shell 14 (FIG. 9). It should be noted that the shoulder 61 can extend continuously or not, and in a more or less regular fashion.

The reinforcement means 60 are also provided with four ribs 62a, 62b, 62c, 62d which are arranged transversally in the bottom of the shell 14. As for the nature of the shell 14, each transversal rib 62a, 62b, 62c, 62d is presented here in the form of a hollow rib, although solid ribs with adapted dimensions can also obviously be used.

According to another particularity of the invention, the packaging device 1 comprises a sealing element that can block the opening of the housing 10. Not shown here for reasons of clarity, the sealing element nonetheless has a shape that is substantially identical to the attachment area 15 which extends perpendicular to the opening of the housing 10 and which, in this case, is an integral part of the shell 14. The sealing element can also have any other shape that is compatible with the length of the blade 100. It can, furthermore, be solidly attached to the attachment area 15 by means of any known fixing technique, mainly by gluing, welding, stapling, lock mechanisms, etc. The sealing element can also be made from any kind of material, and mainly from cardboard so as to be able advantageously to carry information.

It should be noted that the sealing element, as in the case of the internal flange 12, also participates in the stiffening of the shell 14, as do the reinforcement means 60.

What is claimed is:

1. An assembly comprising:
   a packaging device;
   a windscreen wiper blade disposed within the packaging device, wherein the windscreen wiper blade is curved by an integrated flexible structure and comprises a linking element;
   the packaging device comprising:
   a housing configured to receive the windscreen wiper blade, wherein the housing comprises:
   a first support surface configured to contact a portion of an upper part of the windscreen wiper blade;
   a second support surface configured to contact a first portion of a lower part of the windscreen wiper blade;
   a third support surface configured to contact a second portion of the lower part of the windscreen wiper blade; and
   hooking means for hanging the packaging device in a substantially vertical fashion,
   wherein the first support surface extends opposite an area situated between the second support surface and the third support surface,
   wherein the first, second, and third support surfaces together at least partially straighten out the windscreen wiper blade inside the housing relative to a resting position of the windscreen wiper blade,
   the packaging device further comprising a stop that cooperates with the linking element of the windscreen wiper blade, wherein the windscreen wiper blade is blocked substantially in the centre of the housing when the packaging device is hung in a substantially vertical fashion, and
   wherein a lip of the windscreen wiper blade does not contact the housing.

2. The packaging device according to claim 1, wherein the first support surface contacts a substantially central portion of the upper part of the windscreen wiper blade, and wherein the second support surface and the third support surface respectively contact substantially extremal portions of the lower part of the windscreen wiper blade.

3. The packaging device according to claim 1, wherein the first support surface is placed substantially at an equal distance from the second support surface and the third support surface.

4. The packaging device according to claim 1, wherein the first support surface comprises a portion of wall that laterally delimits the housing.

5. The packaging device according to claim 1, wherein the linking element is located on the upper part of the windscreen wiper blade intended to enable an assembly of the windscreen wiper blade on a driving mechanism.

6. The packaging device according to claim 1, wherein the second support surface and the third support surface comprises portions of a flange arranged longitudinally in a bottom of the housing.

7. The packaging device according to claim 1, wherein the second support surface and the third support surface contact a heel of the windscreen wiper blade.

8. The packaging device according to claim 1, wherein the second support surface and the third support surface both contact the integrated flexible structure of a heel of the windscreen wiper blade.

9. The packaging device according to claim 1, further comprising a restraint configured to block at least a part of the windscreen wiper blade inside the housing, according to a direction that is substantially perpendicular to a sagittal plane of the windscreen wiper blade.

10. The packaging device according to claim 9, wherein the restraint pins at least a part of the windscreen wiper blade against a bottom of the housing.

11. The packaging device according to claim 9, wherein the restraint comprises a stop that is placed directly below the housing and which contacts a portion of the lateral side of the windscreen wiper blade.

12. The packaging device according to claim 1, wherein the linking element is disposed on the upper part of the windscreen wiper blade intended to enable an assembly of the windscreen wiper blade on a driving mechanism, and wherein a centering means comprises the stop that contacts said linking element.

13. The packaging device according to claim 1, wherein the housing is delimited by a substantially rigid shell.

14. The packaging device according to claim 13, wherein the shell is transparent or translucent.

15. The packaging device according to claim 1, further comprising a reinforcement that increases the rigidity of a shell, wherein the housing is delimited by the shell.

16. The packaging device according to claim 15, wherein the reinforcement comprises a shoulder which is made in the periphery of an opening of the housing and which extends substantially perpendicular to the side wall of the shell.

17. The packaging device according to claim 15, wherein the reinforcement comprises at least one rib placed transversally in the bottom of the shell.

18. The packaging device according to claim 1, further comprising a sealing element that blocks an opening of the housing.

* * * * *